US011102628B2

(12) United States Patent
Sim

(10) Patent No.: US 11,102,628 B2
(45) Date of Patent: Aug. 24, 2021

(54) MESSAGE ROUTING SYSTEM AND METHOD THEREOF

(71) Applicants: Hyundai Motor Company, Seoul (KR); Kia Motors Corporation, Seoul (KR)

(72) Inventor: WonSeon Sim, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/663,213

(22) Filed: Oct. 24, 2019

(65) Prior Publication Data
US 2020/0213820 A1 Jul. 2, 2020

(30) Foreign Application Priority Data

Dec. 26, 2018 (KR) .................. 10-2018-0168888

(51) Int. Cl.
*H04W 4/30* (2018.01)
*H04W 4/18* (2009.01)
*H04W 4/20* (2018.01)
*H04W 4/14* (2009.01)
*H04W 4/40* (2018.01)
*H04L 12/721* (2013.01)
*G07C 5/00* (2006.01)
*H04L 12/66* (2006.01)
*H04L 29/08* (2006.01)
(Continued)

(52) U.S. Cl.
CPC .............. *H04W 4/30* (2018.02); *G07C 5/008* (2013.01); *H04L 12/40* (2013.01); *H04L 12/66* (2013.01); *H04L 29/12216* (2013.01); *H04L 45/34* (2013.01); *H04L 67/12* (2013.01); *H04W 4/14* (2013.01); *H04W 4/18* (2013.01); *H04W 4/40* (2018.02); *H04L 2012/40215* (2013.01); *H04L 2012/40273* (2013.01); *H04W 4/203* (2013.01)

(58) Field of Classification Search
CPC ........... H04W 4/12; H04W 4/14; H04W 4/18; H04W 4/20; H04W 4/38–60; H04W 88/14–184; H04W 92/04; H04W 92/14; H04W 92/24
See application file for complete search history.

(56) References Cited

U.S. PATENT DOCUMENTS 6,654,355 B1 * 11/2003 Marbach ............. H04L 12/4135
370/285
9,649,999 B1 * 5/2017 Amireddy ............... H04W 4/14
(Continued)

*Primary Examiner* — San Htun
(74) *Attorney, Agent, or Firm* — Morgan, Lewis & Bockius LLP

(57) ABSTRACT

In order to perform message routing utilizing service-oriented communication without having inquiry of a routing database storing all message transmission paths between a plurality of controllers, a message routing system according to an embodiment includes: an adapter configured to perform a conversion between a CAN message for CAN (Controller Area Network) communication and a service message for service-oriented communication; and a gateway configured to receive an offer-service message and a service subscription message from the plurality of controllers through the adapter, and set a message transmission path between the plurality of controllers based on the offer-service message and the service subscription message.

14 Claims, 5 Drawing Sheets

(51) Int. Cl.
*H04L 29/12* (2006.01)
*H04L 12/40* (2006.01)

(56) References Cited

U.S. PATENT DOCUMENTS

| | | | |
|---|---|---|---|
| 2007/0140294 A1* | 6/2007 | Takatori | H04L 12/66 370/466 |
| 2011/0153149 A1* | 6/2011 | Jeon | H04L 29/12849 701/29.6 |
| 2013/0195037 A1* | 8/2013 | Gundavelli | H04L 29/12254 370/329 |
| 2016/0050265 A1* | 2/2016 | Botticelli | H04L 67/125 709/219 |
| 2016/0191572 A1* | 6/2016 | Joy | H04L 12/413 370/402 |
| 2016/0242043 A1* | 8/2016 | Dong | H04W 24/02 |
| 2017/0054574 A1* | 2/2017 | Wu | H04L 12/4641 |

* cited by examiner

-PRIOR ART-

FIG. 5

| Source | | CAN ID | Service ID | Destination |
|---|---|---|---|---|
| SENSOR | SERVICE | | | |
| SENSOR 1 (100) | SERVICE 1 | 0x0000 | S0 | CONTROLLER 3-1 (311) |
| SENSOR 1 (100) | SERVICE 2 | 0x0001 | S1 | CONTROLLER 4 (401) |
| SENSOR 1 (100) | SERVICE 1 & 2 | 0x0002 | S2 | CONTROLLER 5 (501) |
| SENSOR 2 (200) | SERVICE 3 | 0x0003 | S3 | CONTROLLER 3-1 or CONTROLLER 4 or CONTROLLER 5 |
| SENSOR 2 (200) | SERVICE 4 | 0x0004 | S4 | CONTROLLER 3-1 or CONTROLLER 4 or CONTROLLER 5 |

MESSAGE ROUTING SYSTEM AND METHOD THEREOF

CROSS-REFERENCE TO RELATED APPLICATION(S)

This application is based on and claims priority under 35 U.S.C. § 119 to Korean Patent Application No. 10-2018-0168888, filed on Dec. 26, 2018 in the Korean Intellectual Property Office, the disclosure of which is incorporated by reference in its entirety.

TECHNICAL FIELD

The present disclosure relates to a message routing system and a method thereof that utilizes service-oriented communication in transmitting and receiving Controller Area Network (CAN) messages between a plurality of controllers in a vehicle.

BACKGROUND

In-vehicle electronic devices can transmit and receive data through a vehicle communication network. Recently, various options have been applied to vehicles, and therefore, the complexity of electric parts and communication networks installed in the vehicles has been increasing.

Generally, electronic control units (ECUs) of the in-vehicle electronic devices communicate with each other using a CAN. For that, a transmission path of a CAN message between a plurality of controllers must be established. A gateway sets the transmission path of the CAN message between the controllers connected to different CAN channels. The gateway retrieves routing information by querying a routing database for all the controllers, and establishes the message transmission path between two specific controllers according to the retrieved result.

However, the prior art had to have a routing database that included all possible cases of number of connections between the controllers to support various options and specifications. If the options applied to the vehicle increase or electronics increase, the routing database needs to be changed. Therefore, there was difficulty in managing the routing database. In addition, there is a problem in that the efficiency of routing is deteriorated due to inquiry of a large routing database.

SUMMARY

It is an aspect of the present disclosure to provide a message routing system and method thereof capable of converting a CAN message into a service message for service-oriented communication and setting a CAN message transmission path between controllers using information included in the service message without having inquiry of a routing database storing all the message transmission paths between a plurality of the controllers.

In accordance with an aspect of the present disclosure, a message routing system comprises: an adapter configured to perform a conversion between a CAN message for CAN communication and a service message for service-oriented communication; and a gateway configured to receive an offer-service message and a service subscription message from a plurality of controllers through the adapter, and set a message transmission path between the plurality of controllers based on the offer-service message and the service subscription message.

The gateway may extract an Internet Protocol (IP) address of a first controller that has transmitted the offer-service message among the plurality of controllers and a first service ID, extract an IP address of a second controller that has transmitted the service subscription message among the plurality of controllers and a second service ID, and establish the message transmission path based on the IP address of the first controller, the IP address of the second controller, the first service ID, and the second service ID.

The gateway may determine service data to be transmitted to the second controller by matching the first service ID and the second service ID, generate a service data message including the service data, and transmit the service data message to the adapter.

The adapter may convert the service data message into the CAN message and transmit the CAN message to the second controller.

The gateway may match the first service ID and the second service ID based on a predetermined priority for each of a plurality of the service IDs included in the first service ID and the second service ID.

The gateway may further include a memory configured to store an IP address of each of the plurality of controllers, a first service information that each of the plurality of controllers is possible to provide, a second service information requested by each of the plurality of controllers, a first service ID and a second service ID corresponding to the first service information and the second service information, and a first CAN ID and a second CAN ID corresponding to the first service information and the second service information.

The adapter may refer to the memory and perform conversion between the CAN message and the service message.

The adapter may be provided with a plurality of the adapters corresponding to each of the plurality of controllers, some of the plurality of adapters are included in the gateway, and another some of the plurality of adapters is provided separately from the gateway.

In accordance with another aspect of the present disclosure, a method of message routing comprises: converting, by an adapter, a controller area network (CAN) message transmitted from a plurality of controllers into a service message; transmitting the service message to a processor of a gateway; and setting a message transmission path between the plurality of controllers based on an offer-service message and a service subscription message included in the service message.

The setting of the message transmission path may include extracting an IP address of a first controller that has transmitted the offer-service message among the plurality of controllers and a first service ID; extracting an IP address of a second controller that has transmitted the service subscription message among the plurality of controllers and a second service ID; and establishing the message transmission path based on the IP address of the first controller, the IP address of the second controller, the first service ID, and the second service ID.

The setting of the message transmission path may further include determining service data to be transmitted to the second controller by matching the first service ID and the second service ID; and generating a service data message including the service data.

The method may further include transmitting the service data message to the adapter; converting the service data message into the CAN message; and transmitting the CAN message to the second controller.

The determining of the service data to be transmitted to the second controller may include matching the first service ID and the second service ID based on a predetermined priority for each of a plurality of the service IDs included in the first service ID and the second service ID.

The converting of a service data message into the CAN message may include referring to a memory, wherein the memory is configured to store an IP address of each of the plurality of controllers, a first service information that each of the plurality of controllers is possible to provide, a second service information requested by each of the plurality of controllers, a first service ID and a second service ID corresponding to the first service information and the second service information, and a first CAN ID and a second CAN ID corresponding to the first service information and the second service information.

The adapter may be included in the gateway or provided separately from the gateway.

The adapter may be provided with a plurality of the adapters corresponding to each of the plurality of controllers, some of the plurality of adapters are included in the gateway, and another some of the plurality of adapters is provided separately from the gateway.

BRIEF DESCRIPTION OF THE DRAWINGS

These and/or other aspects of the present disclosure will become apparent and more readily appreciated from the following description of the embodiments, taken in conjunction with the accompanying drawings of which:

FIG. 5 is a table to illustrate the results of message routing.

DETAILED DESCRIPTION

Figure 1:
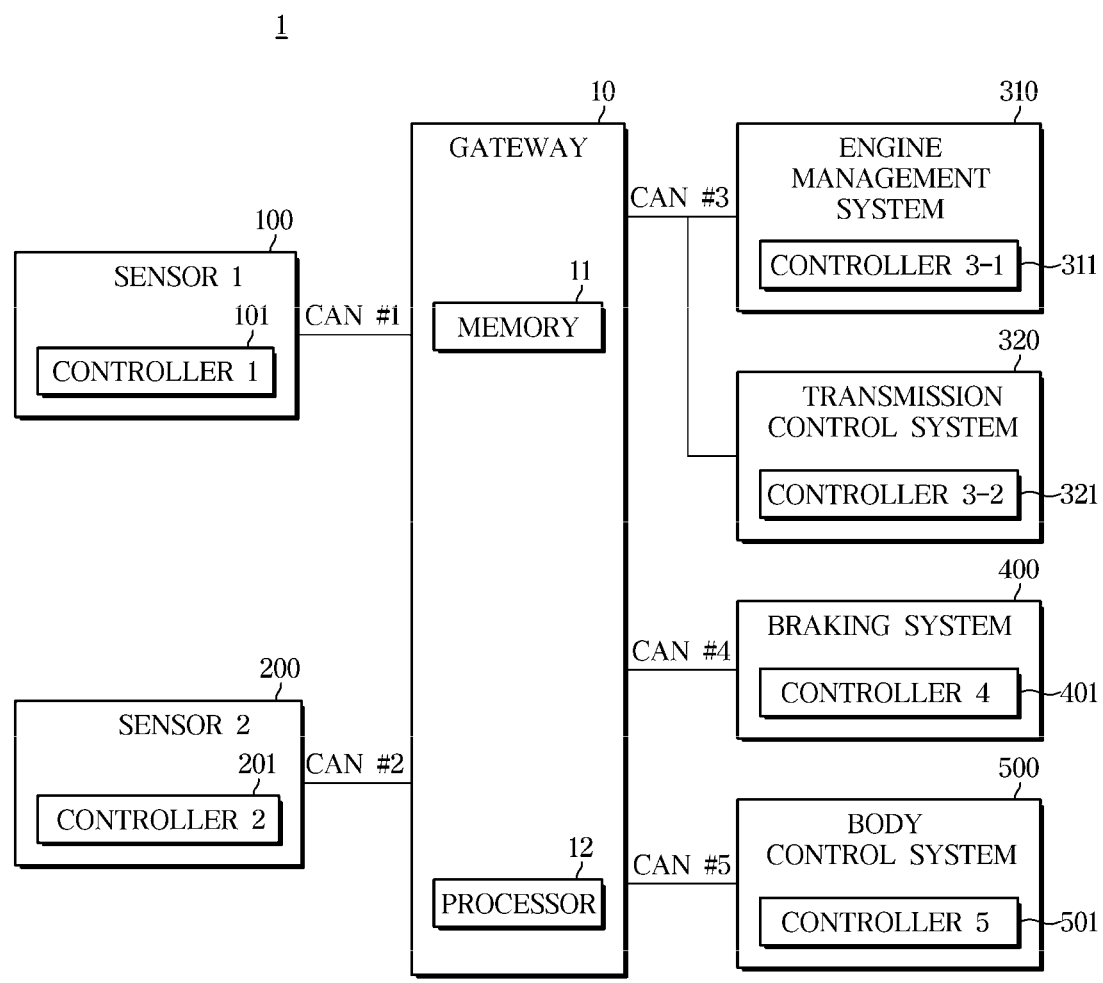
FIG. 1 shows a configuration of a message routing system according to a prior art.

Like reference numerals refer to like elements throughout the specification. Not all elements of embodiments of the disclosure will be described, and description of what are commonly known in the art or what overlap each other in the embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be understood that when an element is referred to as being "connected" to another element, it can be directly or indirectly connected to the other element, wherein the indirect connection includes "connection" via a wireless communication network.

When a part "includes" or "comprises" an element, unless there is a particular description contrary thereto, the part may further include other elements, not excluding the other elements.

It will be understood that, although the terms first, second, third, etc., may be used herein to describe various elements, it should not be limited by these terms. These terms are only used to distinguish one element from another element. As used herein, the singular forms "a," "an" and "the" are intended to include the plural forms as well, unless the context clearly indicates otherwise.

As used herein, the terms "portion," "unit," "block," "member," or "module" refer to a unit that can perform at least one function or operation. For example, these terms may refer to at least one process which is performed by at least one piece of hardware such as a field-programmable gate array (FPGA) and an application specific integrated circuit (ASIC), and at least one piece of software stored in a memory or a processor.

An identification code is used for the convenience of the description but is not intended to illustrate the order of each step. Each of the steps may be implemented in an order different from the illustrated order unless the context clearly indicates otherwise.

The principle and embodiments of the present disclosure will now be described with reference to the accompanying drawings.

FIG. 1 shows a configuration of a message routing system according to a prior art.

Referring to FIG. 1, a vehicle includes various electronic devices. For example, the vehicle may include various sensors such as a sensor 1 (100) and a sensor 2 (200). Such sensor may be a camera that captures images of the surroundings of the vehicle and collects image data. Further, the sensor may be a radar that acquires positional information, distance information, speed information, and the like of an object (e.g., a preceding vehicle, a pedestrian, etc.).

The sensor may include a speed sensor for detecting a speed, an acceleration sensor for detecting an acceleration of the vehicle, a yaw rate sensor for detecting a rotational angular speed of the vehicle, a gyro sensor for detecting an inclination of the vehicle, a steering angle sensor for detecting a rotation and steering angle of the steering wheel, a temperature sensor for detecting an internal temperature and an external temperature of the vehicle, an illuminance sensor for detecting an external illuminance, and the like.

The vehicle may include an engine management system 310 for generating power, a transmission control system 320 for transmitting the power generated by an engine to wheels, a braking system 400 for decelerating or stopping the vehicle, and a body control system 500 for providing comfort to a driver or ensuring the safety of the driver.

The body control system 500 may include an airbag control device for the purpose of safety of an occupant, such as the driver, in the event of a vehicle collision, an electronic stability control (ESC) for controlling the attitude of the vehicle when accelerating or cornering the vehicle, a lane keeping assist system that assists the driver in leaving a driving lane, lane following assist, and the like.

Each of these electronic devices may include controllers 101, 201, 311, 321, 401, and 501. The controllers 1 to 5 (101, 201, 311, 321, 401, and 501) can control each of the devices. Specifically, the controller 1 (101) may control the sensor 1 (100) and the controller 2 (201) may control the sensor 2 (200). The controller 3-1 (311) may control the engine management system 310. The controller 3-2 (321) may control the transmission control system (320). The controller 4 (401) may control the braking system 400. The controller 5 (501) may control the body control system 500. The controllers 101, 201, 311, 321, 401, and 501 may denote an electronic control unit (ECU).

The controllers 101, 201, 311, 321, 401, and 501 may exchange data with each other through a vehicle communication network. As the vehicle communication network, CAN (Controller Area Network) communication is typically used.

In CAN communication, a plurality of the controllers can be classified and connected to different CAN channels. For example, as shown in FIG. 1, the controller 1 (101) may be connected to a first CAN channel (CAN #1). The controller 2 (201) may be connected to a second CAN channel (CAN #2). The controller 3-1 (311) and the controller 3-2 (321) may be connected to a third CAN channel (CAN #3). The controller 4 (401) may be connected to a fourth CAN channel (CAN #4). The controller 5 (501) may be connected to a fifth CAN channel (CAN #5).

A gateway 10 performs routing for exchanging CAN messages between the plurality of controllers 101, 201, 311, 321, 401, and 501 connected to the different CAN channels. For example, in order for the CAN message generated by the controller 1 (101) to be transmitted to the controller 4 (401), a CAN message transmission path connecting the first CAN channel (CAN #1) to the fourth CAN channel (CAN #4) must be established.

The gateway 10 inquires a routing database and performs routing between the plurality of controllers 101, 201, 311, 321, 401, and 501. In general, the CAN message includes a CAN ID including service information provided by the controller, and does not include address information of a source transmitting a message and address information of a destination to receive a message.

It is difficult to enter an array of information in a static CAN communication message because there are many limitations unlike a communication method using dynamic and service-oriented Ethernet. Therefore, the routing database is required, which includes the address information of the source transmitting the message and the address information of the destination to receive the message.

The gateway 10 can inquire the CAN ID of the CAN message in the routing database and transmit the CAN message to the CAN channel including the controller requesting the corresponding message.

In other words, when the gateway 10 receives the CAN message, the gateway 10 extracts the CAN ID from the CAN message, inquires the routing database, and checks whether the extracted CAN ID exists. When the message transmission path corresponding to the extracted CAN ID exists in the routing database, the gateway 10 transmits the CAN message to the corresponding message transmission path.

However, such conventional technology has a problem in that all existing routing databases must be changed when a controller is added or physical architecture is changed. That is, if the controller is added, all possible message transmission paths associated with the added controller must be added to the routing database.

In the prior art, the gateway 10 broadcasts the received CAN message to all of the CAN channels, and determines the message transmission path according to whether a response message is received. Therefore, the message can be unnecessarily transmitted to a controller that does not require the CAN message.

On the other hand, the present invention can convert the CAN message into a service message for service-oriented communication and can automatically set the CAN message transmission path between the controllers using information included in the service message, without having inquiry of the routing database.

Hereinafter, the message routing system and message routing method will be described in detail.

Figure 2:
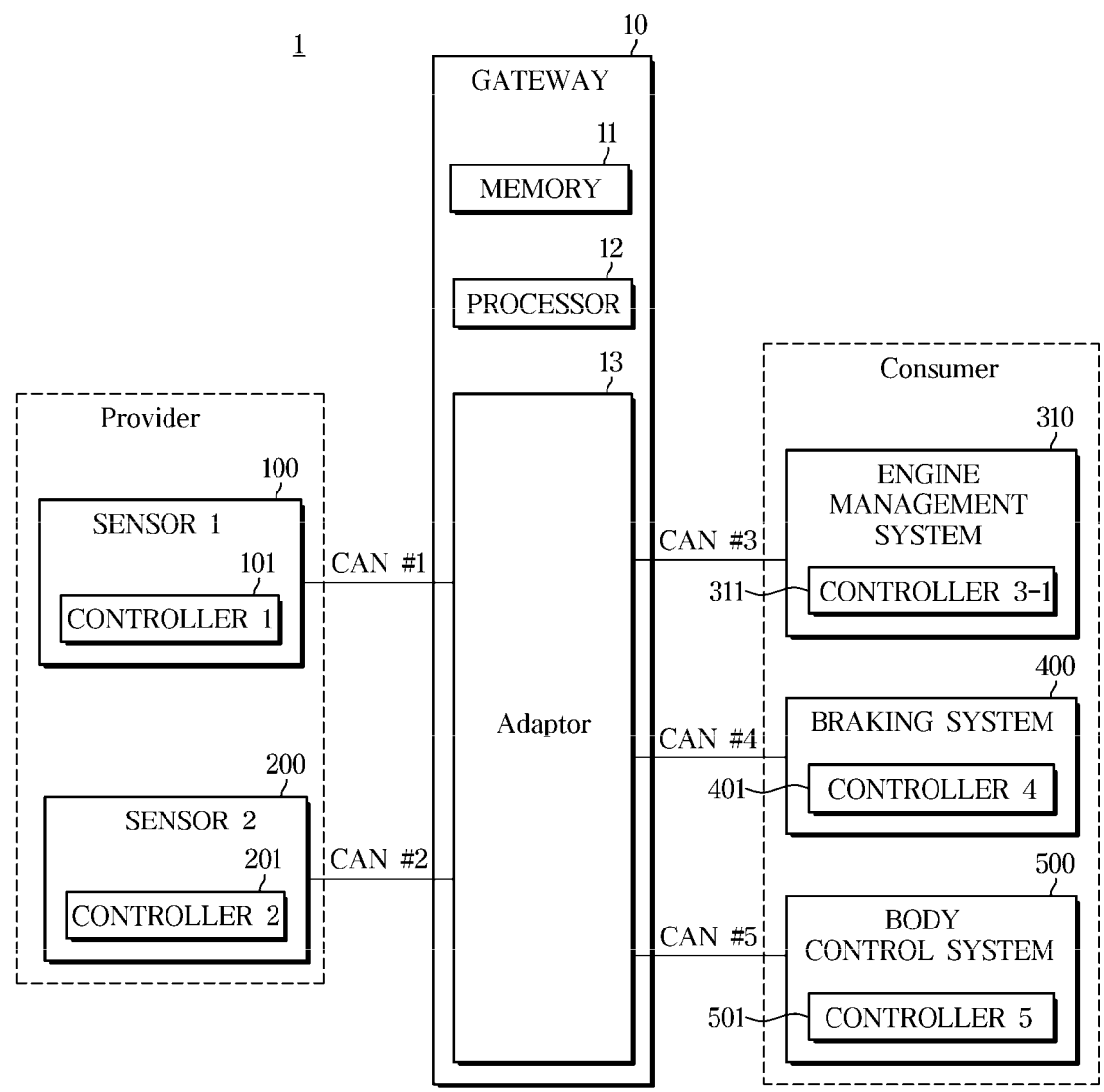
FIG. 2 shows a configuration of a message routing system according to an exemplary embodiment of the present disclosure.
Figure 3:
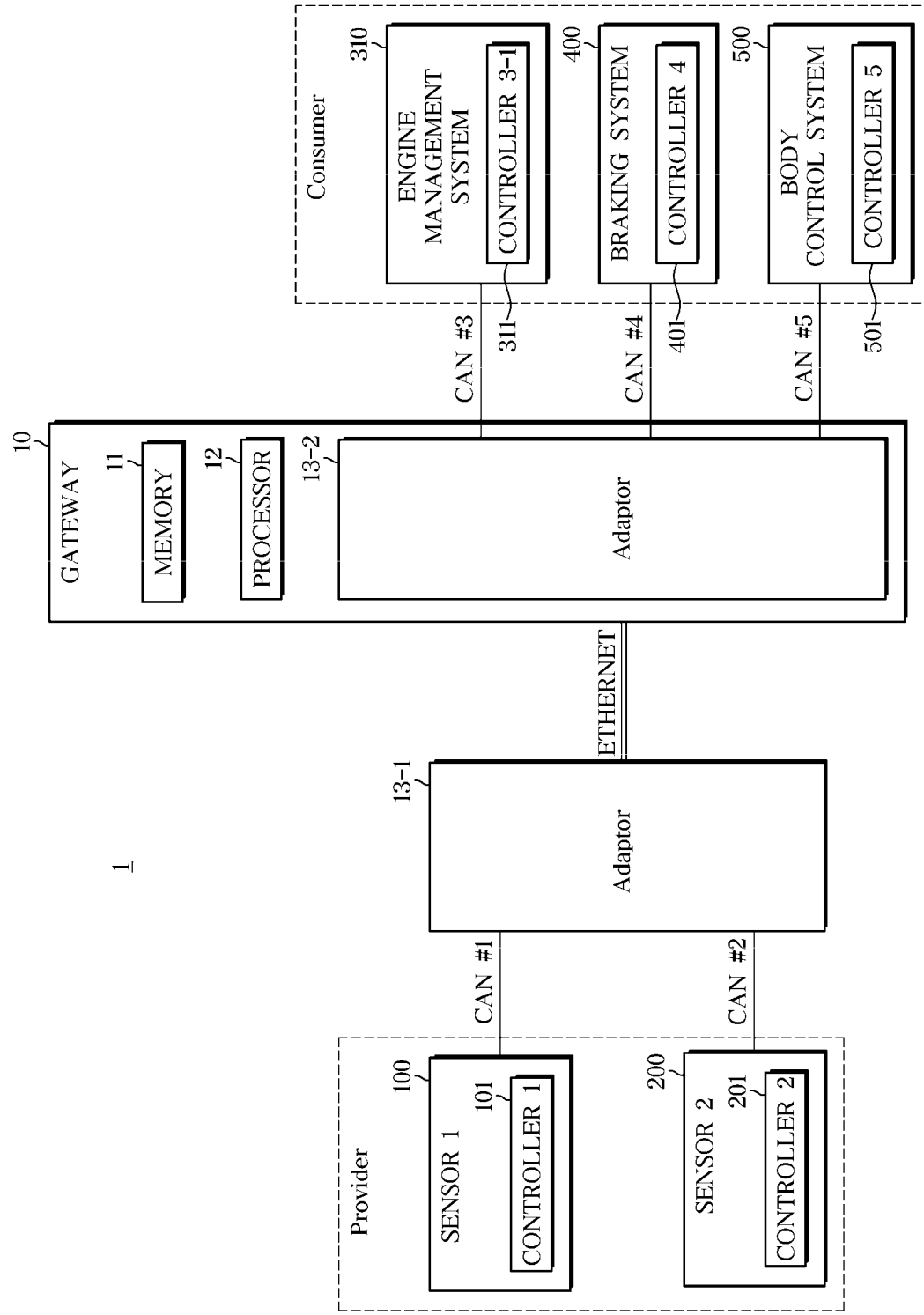
FIG. 3 shows a configuration of a message routing system according to another exemplary embodiment of the present disclosure.

FIG. 2 shows a configuration of a message routing system according to an exemplary embodiment of the present disclosure. FIG. 3 shows a configuration of a message routing system according to another exemplary embodiment of the present disclosure.

Referring to FIG. 2, a message routing system 1 according to an embodiment may include the plurality of controllers 101, 201, 311, 321, 401, and 501 and the gateway 10. The plurality of controllers 101, 201, 311, 321, 401, and 501 are the same as those described with reference to FIG. 1, and redundant description will be omitted.

The gateway 10 may include a memory 11, a processor 12, and an adapter 13. Further, as shown in FIG. 3, the adapter 13 may not be included in the gateway 10 but may be provided separately. The adapter 13 may be provided with a plurality of adapters 13-1 and 13-2 corresponding to the plurality of controllers 101, 201, 311, 321, 401 and 501, respectively.

In addition, some of the adapters 13-2 of the plurality of adapters 13-1 and 13-2 may be included in the gateway 10, and another some of the adapters 13-1 of the plurality of adapters 13-1 and 13-2 may be provided separately from the gateway 10. The adapter 13-1 provided outside the gateway 10 can communicate with the gateway 10 via Ethernet. That is, even if the physical architecture of the system changes, the same message routing method can be applied.

The memory 11 may store an algorithm and/or a program for performing message routing. The processor 12 may perform message routing using algorithms and/or programs stored in the memory 11.

The memory 11 may store an IP address of each of the plurality of controllers 101, 201, 311, 321, 401, and 501, a first service information that each of the plurality of controllers 101, 201, 311, 321, 401, and 501 is possible to provide, a second service information requested by each of the plurality of controllers 101, 201, 311, 321, 401, and 501, a first service ID and a second service ID respectively corresponding to the first service information and the second service information, and a first CAN ID and a second CAN ID respectively corresponding to the first service information and the second service information.

When there are a plurality of the memories 11 and the processor 12, they may be integrated on one chip or provided at physically separated positions.

The memory 11 may be embodied as at least one of nonvolatile memory elements such as cache, ROM (Read Only Memory), PROM (Programmable ROM), EPROM (Erasable Programmable ROM), and EEPROM (Electrically Erasable Programmable ROM); a volatile memory device such as RAM (Random Access Memory); or a storage medium such as a hard disk drive (HDD) and a CD-ROM, for storing various kinds of information. However, it is not limited thereto.

The adapter 13 performs conversion between the CAN message for CAN (Controller Area Network) communication and the service message for service-oriented communication. The adapter 13 can convert the CAN message transmitted from the plurality of controllers 101, 201, 311, 321, 401, and 501 into the service message and convert the service message into the CAN message. The service message includes an offer-service message and a service subscription message.

Service-oriented communication is a dynamic communication method distinguishable from the static CAN communication. The service-oriented communication performs data exchange between the plurality of controllers 101, 201, 311, 321, 401, and 501 through a service discovery process and a data access process. The interface for this service-oriented communication may be provided by Service Oriented Middleware over Internet Protocol (SOME/IP) protocol. In addition to the SOME/IP protocol, various protocols that can provide the service-oriented communication can be applied.

In the service-oriented communication, each of the plurality of controllers 101, 201, 311, 321, 401, and 501 may serve as a service provider or a service consumer. For example, as shown in FIG. 2, the controller 1 (101) of the sensor 1 (100) and the controller 2 (201) of the sensor 2 (200) are the service providers, and the controller 3-1 (311), the controller 4 (401) and the controller 5 (501) may be the service consumers. The controller 3-1 (311), the controller 4 (401), and the controller 5 (501) may serve as the service provider.

For convenience of explanation, the controller 1 (101), which is the service provider, is defined as a first controller, and the controller 3-1 (311), which is the service consumer, is defined as a second controller.

The first controller, which is the service provider, can transmit the CAN message to the adapter 13, including the first service information that can be provided by itself. The adapter 13 may convert the CAN message transmitted by the first controller into an offer-service message. The offer-service message may include an IP address of the first controller, the first service information that can be provided by the first controller, and a first service ID corresponding to the first service information that can be provided.

In addition, the second controller, which is the service consumer, can send the CAN message that contains the necessary second service information to the adapter 13. The adapter 13 can convert the CAN message transmitted by the second controller into the service subscription message. The service subscription message may include an IP address of the second controller, the second service information requested by the second controller, and a second service ID corresponding to the requested second service information.

The adapter 13 can extract the CAN ID from the CAN message and convert the CAN message into the service message based on the information stored in the memory 11. Specifically, the adapter 13 can refer to the memory 11, extract the service ID corresponding to the CAN ID, and generate the service message using the information associated with the extracted service ID.

The adapter 13 may transmit the converted offer-service message and the service subscription message to the processor 12 of the gateway 10.

The gateway 10 can receive the offer-service message and the service subscription message from the plurality of controllers 101, 201, 311, 321, 401 and 501 via the adapter 13. The gateway 10 can set the transmission path of the CAN message between the plurality of controllers 101, 201, 311, 321, 401, and 501 based on the offer-service message and the service subscription message.

The gateway 10 may detect a controller connected to the network based on the received offer-service message and the service subscription message.

Specifically, the gateway 10 can extract the IP address of the first controller, for example, the controller 1 (101), that has transmitted the offer-service message and the first service ID among the plurality of controllers 101, 201, 311, 321, 401, and 501. The gateway 10 may extract the IP address of the second controller, for example, the controller 3-1 (311), that transmitted the service subscription message and the second service ID among the plurality of controllers 101, 201, 311, 321, 401, and 501.

The gateway 10 can set the transmission path of the CAN message based on the IP address of the first controller, the IP address of the second controller, the first service ID, and the second service ID. The gateway 10 can locate the controller from the IP address of the controller.

The gateway 10 may determine the service data to be transmitted to the second controller, for example, the controller 3-1 (311), by matching the first service ID and the second service ID. The processor 12 of the gateway 10 may generate and transmit the service data message including the service data to the adapter 13. The adapter 13 may convert the service data message into the CAN message and transmit the CAN message to the second controller.

The gateway 10 may match the first service ID and the second service ID based on a predetermined priority for each of a plurality of the service IDs included in the first service ID and the second service ID.

The gateway 10 may search the first service information provided by the first controller included in the first service ID and the second service information requested by the second controller included in the second service ID, and match the first service ID and the second service ID by searching for the corresponding service information. The gateway 10 can determine the message transmission path based on the matching result of the first service ID and the second service ID.

Figure 4:
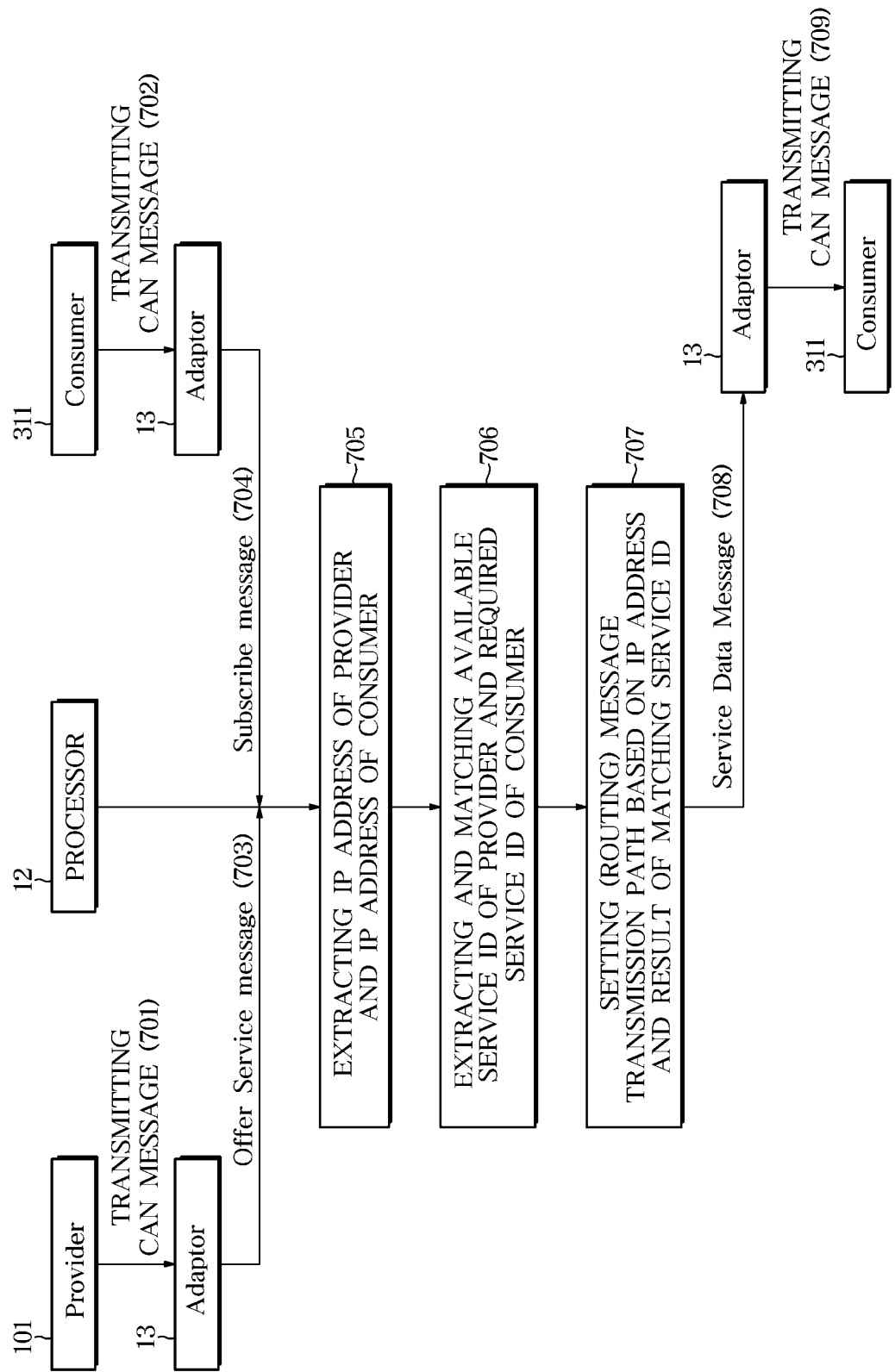
FIG. 4 is a flow chart illustrating a message routing method according to an exemplary embodiment of the present disclosure.

FIG. 4 is a flow chart illustrating a message routing method according to an exemplary embodiment of the present disclosure.

Referring to FIG. 4, the message routing system 1 may include the controller 1 (101) as the service provider, the controller 3-1 (311) as the service consumer, the processor 12 of the gateway 10 and the adapter 13.

For convenience of explanation, the controller 1 (101), which is the service provider, is defined as the first controller, and the controller 3-1 (311), as the service consumer, is defined as the second controller.

The first controller may send the CAN message containing the first service information that can be provided to the adapter 13 (701). The second controller may send the CAN message containing the required second service information to the adapter 13 (702).

The adapter 13 may convert the CAN message transmitted by the first controller into the offer-service message and transmit the offer-service message to the processor 12 (703). The adapter 13 can convert the CAN message transmitted by the second controller into the service subscription message and transmit the service subscription message to the processor 12 (704).

The adapter 13 can extract the CAN ID from the CAN message and convert the CAN message into the service message based on the information stored in the memory 11. Specifically, the adapter 13 can refer to the memory 11, extract the service ID corresponding to the CAN ID, and generate the service message using the information associated with the extracted service ID.

The offer-service message may include an IP address of the first controller, the first service information that can be provided by the first controller, and the first service ID corresponding to the first service information that can be provided. The service subscription message may include an IP address of the second controller, the second service information requested by the second controller, and a second service ID corresponding to the requested second service information.

The processor 12 of the gateway 10 may extract the IP address of the first controller from the offer-service message and extract the IP address of the second controller from the service subscription message (705).

In addition, the processor 12 may extract the first service ID corresponding to the first service information that can be provided by the first controller from the offer-service message. The processor 12 may extract the second service ID corresponding to the second service information requested by the second controller from the service subscription message. The processor 12 may match the extracted first service ID and the extracted second service ID (706).

The first service ID may include a plurality of the service IDs corresponding to a plurality of the first service information that can be provided by the first controller. The second service ID may include a plurality of the service IDs corresponding to the second service information requested by the second controller.

The processor 12 may set the message transmission path based on the IP address of the first controller, the IP address of the second controller, and the result of matching the first service ID and the second service ID (707). That is, the processor 12 may perform message routing based on the IP address of the first controller, the IP address of the second controller, and the result of matching the first service ID and the second service ID.

The processor 12 may determine the service data to be transmitted to the second controller (the controller 3-1 (311)) by matching the first service ID and the second service ID. The processor 12 may generate and send the service data message containing the service data to the adapter 13 (708).

The adapter 13 may convert the service data message into the CAN message and transmit the CAN message to the second controller (the controller 3-1 (311)) (709).

FIG. 5 is a table to illustrate the results of message routing.

Referring to FIG. 5, the sensor 1 (100) may provide at least one of service 1 or service 2. The sensor 2 (200) may provide service 3 or service 4. The controller 101 of the sensor 1 (100) and the controller 201 of the sensor 2 (200) each transmit the CAN message including the first service information that they can provide to the adapter 13.

The controller 3-1 (311) may request at least one of the service 1, the service 3 or the service 4. The controller 4 (401) may request at least one of the service 2, the service 3 or the service 4. The controller 5 (501) may request at least one of a combination of the service 1 and the service 2, the service 3, or the service 4.

Each of the controller 3-1 (311), the controller 4 (401), and the controller 5 (501) transmits the CAN message including the second service information requested by them to the adapter 13.

The adapter 13 may receive the CAN message from the controller 101 of the sensor 1 (100), the controller 201 of the sensor 2 (200), the controller 3-1 (311), the controller 4 (401) and the controller 5 (501), and convert each of the CAN messages into the offer-service message or the service subscription message. The adapter 13 can extract the CAN ID included in the CAN message and generate the service message including the service ID corresponding to the extracted CAN ID. Therefore, the offer-service message and the service subscription message may include the IP address and the service ID of each of the controllers.

As shown in FIG. 5, the CAN ID corresponding to the service 1 may be 0x0000, and the service ID corresponding to the service 1 may be S0. The CAN ID corresponding to the service 2 may be 0x0001, and the service ID corresponding to the service 2 may be S1. The CAN ID corresponding to the combination of the service 1 and the service 2 may be 0x0002, and the service ID corresponding to the combination of the service 1 and the service 2 may be S2. The CAN ID corresponding to the service 3 may be 0x0003, and the service ID corresponding to the service 3 may be S3. The CAN ID corresponding to the service 4 may be 0x0004, and the service ID corresponding to the service 4 may be S4.

The processor 12 of the gateway 10 receives the offer-service message and the service subscription message from the adapter 13 and extracts the IP address of the controllers and the service ID included in the offer-service message and the service subscription message.

For example, the offer-service message transmitted from the controller 101 of the sensor 1 (100) may include the service IDs S0, S1, S2 corresponding to the service 1, the service 2, and combination of the service 1 and the service 2, respectively. That is, the first service ID may include the service IDs S0, S1, and S2.

Also, the service subscription message transmitted from the controller 3-1 (311) may include the service IDs S0, S3, and S4 corresponding to the service 1, the service 3, and the service 4, respectively. That is, the second service ID may include the service IDs S0, S3, and S4.

The processor 12 may extract the service IDs S0, S1 and S2 from the offer-service message of the sensor 1 (100) and extract the service IDs S0, S3 and S4 from the service subscription message of the controller 3-1 (311).

The processor 12 matches the extracted service ID. That is, the processor 12 detects the same service ID among the service IDs extracted from the offer-service message and the service ID extracted from the service subscription message. Among the service IDs S0, S1 and S2 which are the service IDs extracted from the offer-service message of the sensor 1 (100), and the service IDs S0, S3, and S4 which are the service IDs extracted from the service subscription message of the controller 3-1 (311), the same service ID is S0.

Accordingly, the processor 12 can determine the message transmission path between the controller 1 (101) and the controller 3-1 (311). Further, the processor 12 can determine the data of the service 1 corresponding to the extracted service ID S0 as the service data to be transmitted to the controller 3-1 (311). The processor 12 generates and transmits the service data message including the data of the service 1 to the adapter 13. The adapter 13 converts the service data message into the CAN message and transmits the CAN message to the controller 3-1 (311).

As another example, the offer-service message transmitted from the controller 201 of the sensor 2 (200) may include the service IDs S3 and S4 corresponding to the services 3 and 4, respectively. As described above, the service subscription message transmitted from the controller 3-1 (311) may include the service IDs S0, S3, and S4 corresponding to the service 1, the service 3, and the service 4, respectively. Accordingly, the processor 12 extracts the service IDs S3 and S4 from the offer-service message of the sensor 2 (200) and extracts the service IDs S0, S3 and S4 from the service subscription message of the controller 3-1 (311).

In this case, the processor 12 matches the service ID and detects the service IDs S3 and S4, which are the service IDs equally included in the offer-service message and the service subscription message. The processor 12 determines the message transmission path between the controller 2 (201) and the controller 3-1 (311). The processor 12 can determine the data of the service 3 corresponding to the service ID S3 and the data of the service 4 corresponding to the service ID S4 as the data to be transmitted to the controller 3-1 (311). The processor 12 generates and transmits the service data message including the data of the service 3 and the data of the service 4 to the adapter 13. The adapter 13 converts the service data message into the CAN message and transmits the CAN message to the controller 3-1 (311).

The transmission order of the data of the service 3 and the data of the service 4 can be determined according to a predetermined priority order. When the data of the service 3 and the data of the service 4 are simultaneously transmitted to the controller 3-1 (311), a collision between the messages may occur.

As another example, a message transmission path may be formed between the controller 101 of the sensor 1 (100) and the controller 4 (401). As shown in FIG. 5, the service subscription message transmitted from the controller 4 (401) may include the service IDs of S1, S3, and S4. The offer-service message transmitted from the sensor 1 (100) includes the service IDs of S0, S1, and S2. Accordingly, the processor 12 can determine the message transmission path between the controller 101 that transmits the data of the service 2 corresponding to S1 and the controller 4 (401).

The message transmission path between the controller 101 of the sensor 1 (100) and the controller 3-1 (311) and the message transmission path between the controller 101 of the sensor 1 (100) and the controller 4 (401) may be simultaneously formed. In this case, the data of the service 1 transmitted from the controller 101 and the data of the service 2 can be transmitted to the controller 3-1 (311) or the controller 4 (401) according to the predetermined priority order.

Likewise, a message transmission path can also be established between the sensor 1 (100) or the sensor 2 (200) and the controller 5 (501).

According to the message routing system and method thereof as described above, CAN messages can be converted into service messages for service-oriented communication and CAN message transmission path between the controllers and can be set using the information included in the service message without having inquiry of a routing database storing all the message transmission paths between the plurality of controllers.

Further, according to the message routing system and method thereof, since the CAN message is not broadcast to all CAN channels, it is possible to prevent a message from being unnecessarily transmitted to a controller that does not require the CAN message.

Further, according to the message routing system and method thereof, since only the database related to the number of controllers, the IP address of each controller, the first service information that each controller can provide, and the second service information required by each controller is required, there is an advantage in that database management is easier than the prior art which requires a vast routing database.

Further, according to the message routing system and method thereof, even if the physical architecture changes, there is no need to change the routing method and the routing database. Therefore, the time and effort spent on database management can be reduced.

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A message routing system comprising:
   an adapter configured to perform a conversion between a Controller Area Network (CAN) message for CAN communication and a service message for service-oriented communication; and
   a gateway configured to:
   receive an offer-service message and a service subscription message from a plurality of controllers through the adapter,
   extract an Internet Protocol (IP) address of a first controller that has transmitted the offer-service message among the plurality of controllers and a first service ID,
   extract an IP address of a second controller that has transmitted the service subscription message among the plurality of controllers and a second service ID,
   establish a message transmission path between the plurality of controllers based on the IP address of the first controller, the IP address of the second controller, the first service ID, and the second service ID,
   search first service information, which is provided by the first controller, included in the first service ID and second service information, which is requested by the second controller, included in the second service ID,
   match the first service ID and the second service ID by searching for corresponding service information, and
   determine the message transmission path based on a matching result of the first service ID and the second service ID,
   wherein the adapter is configured to refer to a memory of the gateway and perform conversion between the CAN message and the service message.

2. The message routing system according to claim 1, wherein the gateway is configured to:
   determine service data to be transmitted to the second controller based on the matching result,
   generate a service data message including the service data, and
   transmit the service data message to the adapter.

3. The message routing system according to claim 2, wherein the adapter is configured to convert the service data message into the CAN message and transmit the CAN message to the second controller.

4. The message routing system according to claim 2, wherein the gateway is configured to match the first service ID and the second service ID based on a predetermined priority for each of a plurality of the service IDs included in the first service ID and the second service ID.

5. The message routing system according to claim 1, wherein the memory is configured to store the IP address of each of the plurality of controllers, the first service information, the second service information, the first service ID and the second service ID respectively corresponding to the first service information and the second service information, and a first CAN ID and a second CAN ID respectively corresponding to the first service information and the second service information.

6. The message routing system according to claim 1, wherein the adapter is included in the gateway or provided separately from the gateway.

7. The message routing system according to claim 1, wherein the adapter includes a plurality of adapters corresponding to each of the plurality of controllers, some of the plurality of adapters are included in the gateway and another some of the plurality of adapters are arranged separately from the gateway.

8. A method of message routing comprising:
   converting, by an adapter, a Controller Area Network (CAN) message transmitted from a plurality of controllers into a service message;
   transmitting the service message to a processor of a gateway;
   extracting an IP address of a first controller that has transmitted an offer-service message among the plurality of controllers and a first service ID;
   extracting an IP address of a second controller that has transmitted a service subscription message among the plurality of controllers and a second service ID;
   establishing a message transmission path between the plurality of controllers based on the IP address of the first controller, the IP address of the second controller, the first service ID, and the second service ID;
   searching first service information, which is provided by the first controller, included in the first service ID and second service information, which is requested by the second controller, included in the second service ID;
   matching the first service ID and the second service ID by searching for corresponding service information; and
   determining the message transmission path based on a matching result of the first service ID and the second service ID,
   wherein the converting includes referring to a memory of the gateway and performing conversion between the CAN message and the service message.

9. The method according to claim 8, wherein the establishing a message transmission path further comprises:
   determining service data to be transmitted to the second controller based on the matching result; and
   generating a service data message including the service data.

10. The method according to claim 9, further comprising:
    transmitting the service data message to the adapter;
    converting the service data message into the CAN message; and
    transmitting the CAN message to the second controller.

11. The method according to claim 9, wherein the matching the first service ID and the second service ID comprises matching the first service ID and the second service ID based on a predetermined priority for each of a plurality of the service IDs included in the first service ID and the second service ID.

12. The method according to claim 8,
    wherein the memory is configured to store the IP address of each of the plurality of controllers, the first service information, the second service information, the first service ID and the second service ID respectively corresponding to the first service information the second service information, and a first CAN ID and a second CAN ID respectively corresponding to the first service information and the second service information.

13. The method according to claim 8, wherein the adapter is included in the gateway or provided separately from the gateway.

14. The method according to claim 13, wherein the adapter includes a plurality of the adapters corresponding to each of the plurality of controllers, some of the plurality of adapters are included in the gateway and another some of the plurality of adapters is provided separately from the gateway.

* * * * *